(12) United States Patent
Brown et al.

(10) Patent No.: US 7,095,835 B2
(45) Date of Patent: Aug. 22, 2006

(54) TIME BASED REGULATION OF USE OF A TELEPHONE LINE

(75) Inventors: Michael Wayne Brown, Georgetown, TX (US); Joseph Herbert McIntyre, Austin, TX (US); Michael A. Paolini, Austin, TX (US); James Mark Weaver, Austin, TX (US); Scott Lee Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 10/082,418

(22) Filed: Feb. 26, 2002

(65) Prior Publication Data

US 2003/0161456 A1 Aug. 28, 2003

(51) Int. Cl.
*H04M 3/00* (2006.01)
*H04M 1/24* (2006.01)
*H04M 3/42* (2006.01)
*G01R 31/08* (2006.01)

(52) U.S. Cl. .............. 379/188; 379/32.02; 379/210.01; 379/216.01; 370/221

(58) Field of Classification Search ................ 379/77, 379/210.01, 114.2, 211.02, 372, 188, 32.02, 379/216.01; 370/221; 704/273; 455/519
See application file for complete search history.

(56) References Cited

U.S. PATENT DOCUMENTS

| | | | | |
|---|---|---|---|---|
| 4,266,098 A | * | 5/1981 | Novak | ........................ 379/77 |
| 4,278,844 A | | 7/1981 | Jones | |
| 5,181,238 A | | 1/1993 | Medamana et al. | |
| 5,499,288 A | | 3/1996 | Hunt et al. | ................... 379/88 |
| 5,566,229 A | | 10/1996 | Hou et al. | ................... 379/88 |
| 5,651,055 A | | 7/1997 | Argade | |
| 5,673,404 A | | 9/1997 | Cousins et al. | ............. 395/347 |
| 5,757,899 A | | 5/1998 | Boulware et al. | |
| 5,790,637 A | | 8/1998 | Johnson et al. | ............... 379/67 |
| 5,802,161 A | * | 9/1998 | Svoronos et al. | ...... 379/216.01 |
| 5,822,400 A | * | 10/1998 | Smith | ...................... 379/32.02 |
| 5,864,613 A | * | 1/1999 | Flood | ......................... 379/188 |
| 5,872,841 A | * | 2/1999 | King et al. | ............ 379/210.01 |
| 5,884,032 A | | 3/1999 | Bateman et al. | |
| 5,889,845 A | * | 3/1999 | Staples et al. | ......... 379/211.02 |
| 5,915,001 A | | 6/1999 | Uppaluru | ................. 379/88.22 |
| 5,937,044 A | | 8/1999 | Kim | |
| 5,940,476 A | | 8/1999 | Morganstein et al. | ..... 379/88.02 |
| 5,946,386 A | | 8/1999 | Rogers et al. | |
| 5,946,654 A | | 8/1999 | Newman et al. | ............ 704/246 |
| 5,978,467 A | | 11/1999 | Walker et al. | ......... 379/266.01 |
| 6,038,305 A | | 3/2000 | McAllister et al. | ......... 379/207 |
| 6,058,364 A | | 5/2000 | Goldberg et al. | ........... 704/252 |
| 6,101,242 A | | 8/2000 | McAllister et al. | ...... 379/88.02 |
| 6,115,613 A | * | 9/2000 | Jonsson | ...................... 455/519 |

(Continued)

FOREIGN PATENT DOCUMENTS

EP 0585004 A2 3/1994

(Continued)

*Primary Examiner*—Wing Chan
*Assistant Examiner*—Thjuan P. Knowlin
(74) *Attorney, Agent, or Firm*—Mark S. Walker; Amy J. Pattillo

(57) ABSTRACT

A method, system, and program for time based regulation of use of a telephone line are provided. An identity of a first caller requesting use of a telephone line is detected. Use of the telephone line by the caller is allowed only if a schedule for the telephone line indicates that the identity is currently allowed for the telephone line.

24 Claims, 8 Drawing Sheets

U.S. PATENT DOCUMENTS

| | | |
|---|---|---|
| 6,122,357 A | 9/2000 | Farris et al. ................. 379/207 |
| 6,160,877 A | 12/2000 | Tatchell et al. |
| 6,178,230 B1 | 1/2001 | Borland ...................... 379/67.1 |
| 6,178,240 B1 | 1/2001 | Walker et al. ......... 379/266.01 |
| 6,263,071 B1* | 7/2001 | Swan et al. ................. 379/372 |
| 6,327,346 B1 | 12/2001 | Infosino .................. 379/88.02 |
| 6,359,971 B1 | 3/2002 | Haimi-Cohen et al. .. 379/88.01 |
| 6,381,316 B1* | 4/2002 | Joyce et al. ............. 379/114.2 |
| 6,456,706 B1* | 9/2002 | Blood et al. ................. 379/188 |
| 6,594,230 B1* | 7/2003 | Yaker ......................... 370/221 |
| 6,671,672 B1* | 12/2003 | Heck .......................... 704/273 |
| 6,724,866 B1 | 4/2004 | Kuhn et al. .............. 379/88.21 |
| 6,826,173 B1 | 11/2004 | Kung et al. |
| 2002/0085698 A1 | 7/2002 | Liebenow |
| 2002/0154752 A1 | 10/2002 | Carpenter |
| 2003/0156695 A1 | 8/2003 | Brown et al. ................ 379/188 |
| 2003/0156696 A1 | 8/2003 | Brown et al. ................ 379/196 |
| 2003/0156700 A1 | 8/2003 | Brown et al. .......... 379/210.02 |
| 2003/0156707 A1 | 8/2003 | Brown et al. .......... 379/201.01 |

FOREIGN PATENT DOCUMENTS

| | | |
|---|---|---|
| EP | 0676882 A2 | 10/1995 |
| JP | 8139797 A | 5/1996 |
| JP | 10294784 A | 11/1998 |

* cited by examiner

TIME BASED REGULATION OF USE OF A TELEPHONE LINE

CROSS-REFERENCE TO RELATED APPLICATIONS

The present application is related to the following copending applications:
- (1) U.S. patent application Ser. No. 10/081,014;
- (2) U.S. patent application Ser. No. 10/081,029;
- (3) U.S. patent application Ser. No. 10/081,017; and
- (4) U.S. patent application Ser. No. 10/081,024.

BACKGROUND OF THE INVENTION

1. Technical Field

The present invention relates in general to telecommunications and, in particular, to call party identification. Still more particularly, the present invention relates to time based regulation of use of a telephone line.

2. Description of the Related Art

Telephone service has created communication channels worldwide, and those channels continue to expand with the advent of cellular and other wireless services. A person can simply take a telephone off-hook and dial a destination number or press a send button and be connected to a telephone line around the world.

General telephone service for local calls is often provided at a flat rate. Other telephone services, such as long distance service, are often billed by the minute or at a flat rate in addition to the charges for local service.

Telephone service subscribers may choose to block use of general telephone service and extra telephone services by requiring a passcode or other entry to access the telephone service. In addition, the requirement of a passcode to access telephone service may allow for easier accounting of charges incurred on a telephone line, where each user of the line is provided with an individual passcode to enter and charges are itemized according to passcode.

However, blocking use of service altogether or requiring a passcode entry only provides generic blocking options. Passcode entry does not solve the problem of determining who gets to use a line when multiple people request access at the same time. In addition, blocking use of a service does not solve the problem of when a phone line may be used.

Therefore, in view of the foregoing, it would be advantageous to provide a method, system, and program for time based regulation of use of a telephone line. In addition, it would be advantageous to provide a method, system, and program for determining which caller is allowed use of a telephone line when multiple callers are requesting access.

SUMMARY OF THE INVENTION

In view of the foregoing, it is therefore an object of the present invention to provide an improved telecommunications system.

It is another object of the present invention to provide a method, system and program for improved call party identification.

It is yet another object of the present invention to provide a method, system and program for time based regulation of use of a telephone line.

According to one aspect of the present invention, an identity of a first caller requesting use of a telephone line is detected. Use of the telephone line by the caller is allowed only if a schedule for the telephone line indicates that the identity is currently allowed for the telephone line.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
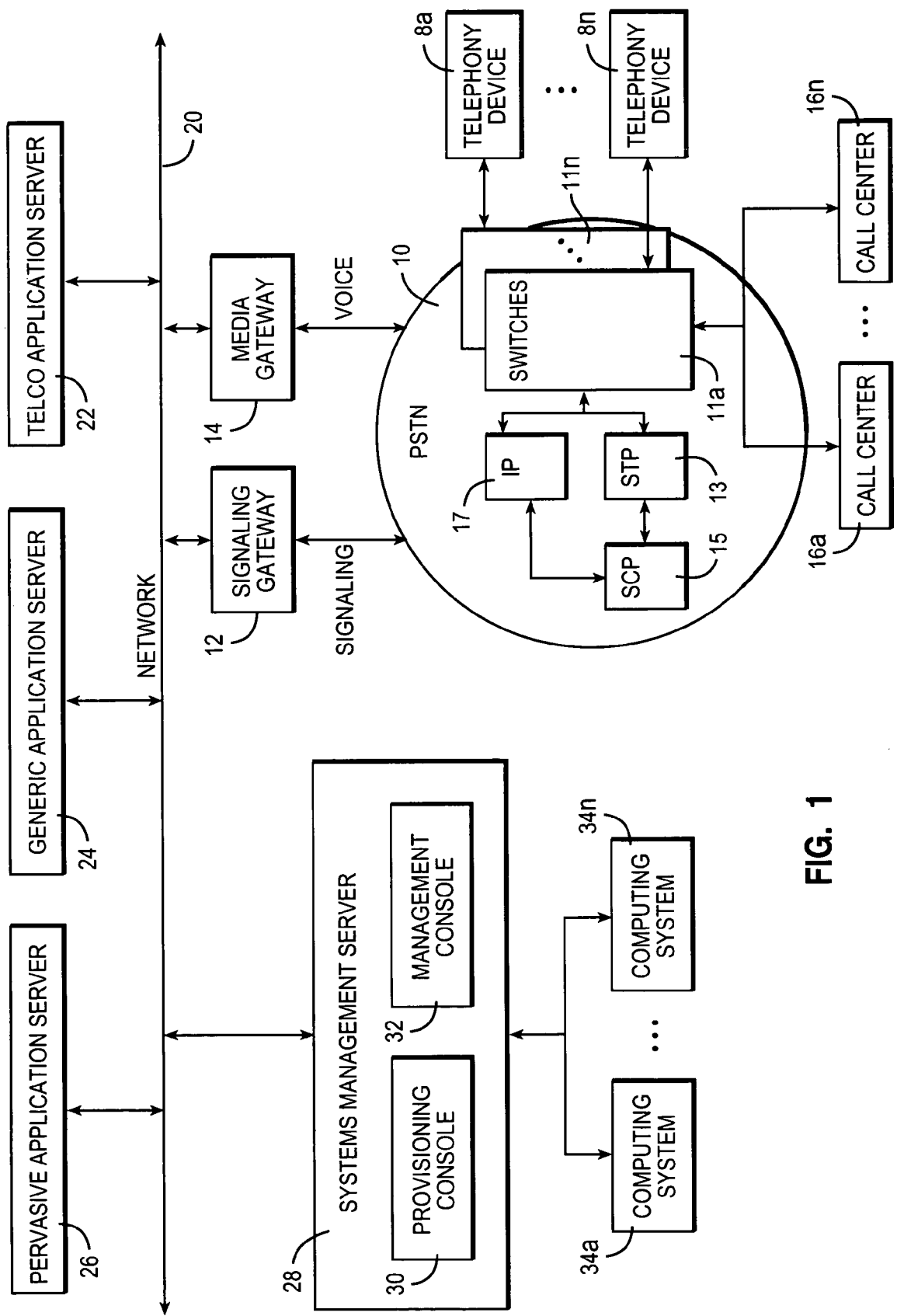
FIG. 1 depicts a block diagram of a network environment in which the present invention may be implemented.

A method, system, and program for time based regulation of use of a telephone line are provided. For purposes of the present invention, the identity of a caller requesting use of a telephone line is preferably authenticated. Then, a schedule for the telephone line is filtered according to the caller identity and other context for a call to determine whether current use by the caller is allowed.

For purposes of the present invention, a schedule associated with a telephone line may be determined from a schedule indicated by a line subscriber, by the schedules of callers with access to the telephone line, or from other calendaring events. Preferably, a schedule includes events indicating when callers are allowed to use a telephone line, ratings for events, points required for different times, and other types of time based regulation events.

In addition, for purposes of the present invention, other context for a call may also include, but is not limited to, the identity of the callee, the identity of the device utilized for accessing telephone line for the call, the location of the device utilized for the call, the requested path of a call, and a billing plan for the call.

In particular, determining relevant scheduled events and other context for a call may be performed by a context inference engine located within an Intelligent Peripheral of the trusted telephone network and/or located within a telecommunications (Telco) Application service outside the trusted telephone network. As will be further described, the Telco application service located outside the trusted telephone network is enabled to provide services to callers and callees via enhanced security channels.

Identity authentication is preferably performed by authenticating the voices of the caller and callee. Identity authentication may be initiated by the origin device originating the call, the intermediary device processing the call, or the destination device receiving the call. Each of the devices may also access a third party or external server to perform the identity authentication. Performance of identity authentication has different advantages depending on the device initiating and performing the identity authentication.

While as described, authentication of a caller or callee identity is described with emphasis placed on voice authentication, other methods of caller and callee identity authentication may also be performed. Voice samples utilized for voice authentication are just one of multiple types of biometric sampling. For example, a caller or callee may locally provide an eye scan, a fingerprint, and other biophysical identifiers that are transmitted within or outside the trusted network to authenticate the identity of the caller or callee. Alternatively, keypad entries, such as a pin code, account number, password, or other secure transaction key may be entered by a caller or callee and utilized to authenticate the identity of the caller or callee.

A single telephone line may be accessed by a single or multiple telephony devices. Schedules may be assigned according to telephone line and each device utilized to access the telephone line.

In addition, a telephone line may be accessed by multiple types of telephony devices, such as wireline based telephony devices, wireless based telephony devices. Further, a telephone line may be controlled by a PBX system that controls multiple outgoing lines, where the number of outgoing lines is often less than the number of telephony devices connected to lines controlled by the PBX system.

For purposes of the present invention, telephony devices are termed origin devices when utilized for origination of a call to an intermediary device and are termed destination devices when utilized for receipt of a call from an intermediary device. Subscribers to a call are termed callers when originating a call and are termed callees when receiving a call. Callers and callees may or may not be line subscribers to the particular telephony device utilized.

In addition, for purposes of the present invention, a trusted telephone network preferably includes a traditional trusted telephone network, however also includes, but is not limited to, an Internet Protocol telephony network, a digital telephone network, and other communication networks.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

With reference now to the figures, and, in particular, with reference now to FIG. 1, there is depicted a block diagram of a network environment in which the present invention may be implemented. While the present invention is described with reference to one type of network environment, it will be understood by one with skill in the art that the present invention may be implemented in alternate types of network environments.

First, the network environment incorporates a Public Switching Telephone Network (PSTN) 10. As is known in the art the core of PSTN 10 may include multiple telephone networks, each owned by one of multiple independent service providers. Each telephone line is carried by an independent service provider within PSTN 10 and is typically assigned to at least one subscriber.

Switching of a call within an independent service provider's telephone network is considered trusted movement within a trusted network because the call remains within the company's telephone network infrastructure. However, calls may be transferred from one service provider's telephone network to another service provider's telephone network in generally trusted movement. Generally, service providers are in competition with one another and therefore there is general trust in transferring a call, but not trust in sharing of subscriber information beyond a subscriber number and name from one service provider to the next without security features or other arrangements.

Advantageously, each telephone network within PSTN 10 may access a data network functioning as an extension to PSTN 10 via an Intranet. Data networks may include, for example, subscriber profiles, billing information, and preferences that are utilized by a service provider to specialize services. Transfer of information between a service provider's data network and telephone network is trusted movement in sharing of information.

Further, each telephone network within PSTN 10 may access server systems external to PSTN 10 in the Internet Protocol over the Internet or an Intranet. Such external server systems may include an enterprise server, an Internet service provider (ISP), an access service provider (ASP), a personal computer, and other computing systems that are accessible via a network. In the present embodiment, transfer of information between PSTN 10 and server systems accessible via a network 20 is untrusted and therefore may require verification and additional security. Network 20 may be preferably considered an external network.

Network 20 may comprise a private network, an Intranet, or a public Internet Protocol network. Specifically, telco application server 22, generic application server 24, pervasive application server 26, and systems management server 28 represent server systems external to PSTN 10 that may be accessed by PSTN 10 over network 20.

In particular, telco application server 22 preferably includes multiple telco specific service applications for providing services to calls transferred to a server external to PSTN 10. In particular, a call may be transferred from PSTN 10 to telco application server 22 to receive at least one service and then the call is transferred back to PSTN 10. PSTN 10 preferably brokers the connection between the telephony device and telco application server 22. Such services may also be provided to calls within PSTN 10, however placing such services at a third party such as telco application server 22, is advantageous because adding services and information to PSTN 10 is time consuming and costly when compared with the time and cost of adding the services through telco application server 22.

Advantageously, as will be further described, the identity of both the caller and the callee may be authenticated by one of telephony devices 8a–8n, PSTN 10, or by telco application server 22. By authenticating the actual identity of the person making a phone call and the person receiving the phone call, rather than the identification of a device from which a call is made and received, an enhanced specialization of services to subscribers may be performed.

An authentication service within telco application server 22 may include identification and verification of the identity of a caller and/or callee of a particular call. Such a service may require that subscribers provide voice samples when setting up a subscription. The stored voice samples may then be compared against voice samples received for a particular call in order to authenticate the identity of a current caller or callee of the particular call.

Generic application server 24 preferably accesses independent server systems that provide services. For example, a messaging server, a financial server, an Internal Revenue Service (IRS) server, and database management system (DBMS) server may be accessed in HTTP via network 20. Each of these servers may include a telco service application that requires authentication of the subscriber before access is granted. For example, a financial server may provide a telco service application that allows an authenticated subscriber to access current financial records and request stock quotes from the financial server.

Pervasive application server 26 manages services for wirelessly networked devices. In particular, pervasive application server 26 preferably handles distribution of wireless packets of voice and data to wirelessly networked devices utilizing a standard such as short messaging service (SMS) messaging or other 3G standards.

Systems management server 28 manages subscriber personalization via the web. In particular, systems management server 28 includes browser technology that includes a provisioning console 30 for establishing a subscriber profile and a management console 32 for managing and updating the subscriber profile. A subscriber preferably accesses the consoles of systems management server 28 via the Internet utilizing a computing system, such as computing systems 34a–34n.

The subscriber profile may be accessed at systems management server 28 by other external servers and PSTN 10 via network 20. In addition, a local copy of a subscriber profile updated in systems management server 28 may be stored within a particular service provider's data network or telephone network. Each service provider may specify the types of preferences and other information included within a subscriber profile.

In particular, a subscriber may provide a voice imprint when establishing a subscriber profile through provisioning console 30. Other types of authentication information may also be provided including, but not limited to, a password, an eye scan, a smart card ID, and other security devices. In addition, a subscriber may designate billing preferences, shopping preferences, buddy list preferences, and other preferences that enable specialized service to the subscriber when the subscriber's identity is authenticated from the voice imprint or other identification.

Advantageously, a management agent is built into each external server to monitor the services provided by each server according to the authenticated subscriber receiving the services. By monitoring service output according to subscriber, the subscriber may then be billed according to each use of a service.

PSTN 10 preferably includes both voice and data signaling networks that interface with network 20 via gateways. Each of the gateways acts as a switch between PSTN 10 and network 20 that may compress a signal, convert the signal into Internet Protocol (other protocol) packets, and route the packets through network 20 to the appropriate server.

In particular, the voice network interfaces with network 20 through media gateway 14 which supports multiple protocol gateways including, but not limited to, SIP. SIP is a signaling protocol for Internet conferencing, telephony, presence, events notification and instant messaging.

In addition, in particular, the data signaling network interfaces with network 20 through signaling gateway 12 which supports multiple protocol gateways including, but not limited to, parlay protocol gateways and SS7 protocol gateways. Internet servers, such as telco application server 22 may include protocol agents that are enabled to interact with multiple protocols encapsulated in Internet Protocol packets including, but not limited to, SS7 protocol, parlay protocol, and SIP.

Looking into PSTN 10, a telephone network typically includes multiple switches, such as central office switches 11a–11n, that originate, terminate, or tandem calls. Central office switches 11a–11n utilize voice trunks for transferring voice communications and signaling links for transferring signals between signaling points.

Between signaling points, one central office switch sends signaling messages to other central office switches via signaling links to setup, manage, and release voice circuits required to complete a call. In addition, between signaling points, central office switches 11a–11n query service control points (SCPs) 15 to determine how to route a call. SCPs 15 send a response to the originating central office switch containing the routing number(s) associated with the dialed number.

SCPs 15 may be general purpose computers storing databases of call processing information. While in the present embodiment SCPs 15 are depicted locally within PSTN 10, in alternate embodiments SCPs 15 may be part of an extended network accessible to PSTN 10 via a network.

One of the functions performed by SCPs 15 is processing calls to and from various subscribers. For example, an SCP may store a record of the services purchased by a subscriber, such as a privacy service. When a call is made to the subscriber, the SCP provides record of the privacy service to initiate an announcement to a caller to identify themself to the subscriber with the privacy service who is being called. Advantageously, authentication of the subscriber receiving the call may be required before the privacy service is initiated for that subscriber.

In particular, network traffic between signaling points may be routed via a packet switch called an service transfer point (STP) 13. STP 13 routes each incoming message to an outgoing signaling link based on routing information. Further, in particular, the signaling network may utilize an SS7 network implementing SS7 protocol.

Central office switches 11a–11n may also send voice and signaling messages to intelligent peripherals (IP) 17 via voice trunks and signaling channels. IP 17 provides enhanced announcements, enhanced digit collection, and enhanced speech recognition capabilities.

Advantageously, the identity of a caller may be authenticated according to voice authentication. Voice authentication is preferably performed by first identifying a subscriber by matching the name or other identifier spoken with a subscriber name or identifier. Next, voice authentication requires verifying that the voice audio signal matches that of the identified subscriber. However, in alternate embodiments, the identity of a caller may be authenticated according to passwords, eye scans, encryption, and other security devices.

In particular, to perform subscriber authentication of audio signals received from callers, IP 17 may include storage for subscriber specific templates or voice feature information, for use in authenticating subscribers based on speech. If a subscriber specific template is not stored on a local IP 17, then a remote IP containing the subscriber specific template may be accessed via a network. In addition, local IP 17 may access systems management server 28 or another repository for voice imprints to access the subscriber specific template.

Where IP 17 authenticates the identity of a caller (e.g. the subscriber placing a call), a voice identifier (VID) representing the authenticated caller identity is transferred as a signal for identifying the caller. In addition, where IP 17 authenticates the identity of a callee (e.g. the subscriber receiving a call), a reverse VID (RVID) including the callee identity is transferred as a signal for identifying the callee.

Alternatively, to perform subscriber authentication of audio signals received from callers, PSTN 10 may broker a caller identity authentication service from telco application server 22. In particular, a signaling channel is opened between central office switches 11*a*–11*n* and telco application server 22 via signaling gateway 12. In addition, a voice channel is opened between central office switches 11*a*–11*n* and telco application server 22 via media gateway 14.

Because telco application server 22 is located outside of the trusted network, there may be a time delay associated with establishing a connection to telco application server 22 and authenticating the identity of a caller that is longer than a time delay present where a caller identity is authenticated by IP 17.

In addition, because telco application server 22 is located outside of the trusted network, it is advantageous to establish a level of security for transactions between telco application server 22 and central office switches 11*a*–11*n*, wherein the level of security is suitable for untrusted communications. A level of security may be implemented by utilizing security based protocols, such as the secure socket layer, and by applying ordinary encryption. In particular, the level of security preferably protects the communication channel between telco application server and PSTN 10 and authenticates the identity of the server from which a caller identity authentication service is accessed. Therefore an additional feature of signaling gateway 12 and media gateway 14 is security verification.

Advantageously, VIDs indicate through text, voice, or video the identity of a caller. For example, a caller's name may be transferred as the identity of a caller. Alternatively, a video clip stored with the subscriber template may be transferred as the identity of a caller. Additionally, VIDs may indicate the identity of the device utilized by a caller to provide context for a call. For purposes of the present invention, the business that the caller is calling on behalf of is also indicated in the VID. Further, VIDs may indicate which system or systems have authenticated the caller identity.

After a VID and/or RVID are determined by IP 17, IP 17 and SCP 15 may communicate to designate which services are available according to VID and RVID. Advantageously, by designating services according to a VID and/or RVID, subscribers are provided with services and billed for those services independent of the devices utilized by subscribers. In particular, a 1129 protocol or other protocol may be utilized to enable signal communications between IP 17 and SCPs 15.

In addition, as previously described, caller authentication to determine VIDs and RVIDs may be performed by an external system, such as telco application server 22. The VID or RVID returned from telco application server 22 may be transferred from central office switches 11*a*–11*n* to SCP 15 in order to access a subscriber profile associated with the VID or RVID. Alternatively, the VID or RVID may first transfer to IP 17, where additional verification of the caller identity is performed. For example, IP 17 may control distribution of the VID to the caller, where the caller is prompted to enter a password or additional information. IP 17 may then initiate loading the caller profile into central office switches 11*a*–11*n* if the additional caller input is verifiable for the VID.

An origin telephony device or destination telephony device may also determine a VID and/or RVID for the caller and/or callee of a call. In particular, telephony devices 8*a*–8*n* and call centers 16*a*–16*n* may function as origin and destination telephony devices. Each of the telephony devices may include a database of voice templates that may be matched to authenticate the identity of a caller or callee. In addition, each of the telephony devices may access a third party, such as telco application server 22, to authenticate the identity of the caller or callee. In either case, the telephony device transmits a VID and/or RVID with a call to PSTN 10.

Telephony devices 8*a*–8*n* may include, but are not limited to wireline devices, wireless devices, pervasive device equipped with telephony features, a network computer, a facsimile, a modem, and other devices enabled for network communication. Advantageously, as previously described, a voice authentication functioning device may be included in each of telephony devices 8*a*–8*n*.

In addition, telephony devices 8*a*–8*n* may each incorporate a display that provides a visual output of a VID or RVID. Alternatively, such a display may be provided in a separate device connected to the line in parallel to telephones 8*a*–8*n*. Advantageously, the identity of the actual caller or actual callee is output to a display in association with a call. In addition, other context information about the caller including, but not limited to, the device from which the call originates or is answered, ratings for a caller or callee, and other context information may be output to a display in association with a call. In particular, where output of the identity of the actual caller or actual callee is blocked, display of other context information may not be blocked, such that context for the call may be provided without revealing the actual identity of the caller or callee.

Telephony devices 8*a*–8*n* are communicatively connected to PSTN 10 via wireline, wireless, ISDN, and other communication links. Preferably, connections to telephony devices 8*a*–8*n* provide digital transport for two-way voice grade type telephone communications and a channel transporting signaling data messages in both directions between telephony devices 8*a*–8*n* and PSTN 10.

In addition to telephony devices 8*a*–8*n*, advanced telephone systems, such as call centers 16*a*–16*n*, may be communicatively connected to PSTN 10 via wireline, wireless, ISDN and other communication links. Call centers 16*a*–16*n* may include PBX systems, hold queue systems, private network systems, and other systems that are implemented to handle distribution of calls to multiple representatives or agents.

Returning to central office switches 11a–11n, typically, one central office switch exists for each exchange or area served by the NXX digits of an NXX-XXXX (seven digit) telephone number or the three digits following the area code digits (NPA) in a ten-digit telephone number. The service provider owning a central office switch also assigns a telephone number to each line connected to each of central office switches 11a–11n. The assigned telephone number includes the area code (NPA) and exchange code (NXX) for the serving central office and four unique digits (XXXX).

Central office switches 11a–11n utilize office equipment (OE) numbers to identify specific equipment, such as physical links or circuit connections. For example, a subscriber's line might terminate on a pair of terminals on the main distribution frame of one of central office switches 11a–11n. The switch identifies the terminals, and therefore a particular line, by an OE number assigned to that terminal pair. For a variety of reasons, a service provider may assign different telephone numbers to the one line at the same or different times. For example, a local carrier may change the telephone number because a subscriber sells a house and a new subscriber moves in and receives a new number. However, the OE number for the terminals and thus the line itself remains the same.

On a normal call, a central office switch will detect an off-hook condition on a line and provide a dial tone. The switch identifies the line by the OE number. The central office switch retrieves profile information corresponding to the OE number and off-hook line. Then, the central office switch receives the dialed digits from the off-hook line terminal and routes the call. The central office switch may route the call over trunks and possibly through one or more central office switches to the central office switch that serves the called party's station or line. The switch terminating a call to a destination will also utilize profile information relating to the destination, for example to transfer the call if appropriate, to apply distinctive ringing, etc.

Authentication of the identity of the requesting caller may be initiated either by the origin device from which a call is requested or by the origin central office providing service to a line number from which the call is requested. IP 17 or telco application server 22 may be accessed by the origin central office to perform caller authentication. In addition, telco application server 22 may be accessed by the origin telephony device to perform caller authentication.

In addition to determining a VID for the identity of the requesting caller, other context of the call may be determined and inferred. A context inference service executing within IP 17 or telco application server 22 may be accessed to determine the context. For example, context such as the billing plan for the requesting caller, the location of the attempted caller, the subject matter of the requested call, and the role of the requesting caller may be determined.

In addition, an average time per call may be accumulated in association with a VID and provided as context to estimate the time for the currently requested call. Average times may be further specified according to the callee, the subject of the call, and other call context.

The context of the call, including the identity of the requesting caller, is preferably utilized to filter a schedule associated with the line number requested for use by the caller. For purposes of the present invention, scheduling filtering is preferably performed by a schedule regulation service executing within the origin telephony device and/or telco application server 22. The schedule may be designated by a line subscriber, by other callers with access to the line number, by a third party, or other party with interest in the line number.

Figure 2:
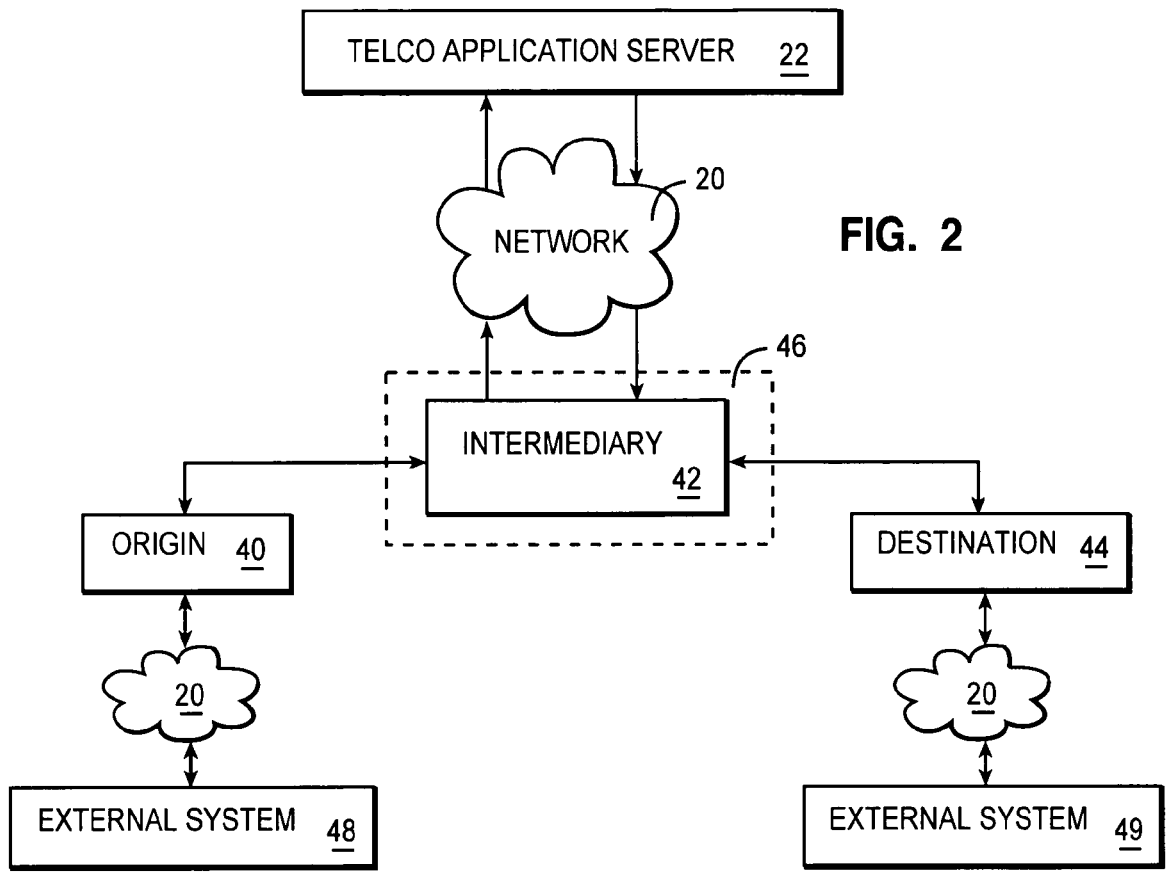
FIG. 2 illustrates a block diagram of an identification system in accordance with the method, system, and program of the present invention.

Referring now to FIG. 2, there is illustrated a block diagram of an identification system in accordance with the method, system, and program of the present invention.

Origin device 40 is utilized by a caller to initiate a call. The caller is prompted by the device performing caller authentication to provide a voice utterance. A VID for the caller is provided to intermediary device 42 from the device performing caller authentication. The VID is utilized to access a caller profile that includes service preferences and billing information. In addition, the VID is transmitted with the call to destination device 44 for identifying the caller.

In general, caller identity authentication is performed by receiving a voice utterance from a caller, analyzing the voice utterance for sound qualities and content, and attempting to match the sound qualities and content of a voice utterance to a voice template previously recorded for a caller, to authenticate the identity of the caller. If there is a match between the voice utterance and a voice template, then a VID is determined for the caller and utilized to authenticate the caller identity for retrieving a caller profile and billing the caller. However, in alternate embodiments, the identity of a caller may be authenticated according to passwords, eye scans, encryption, and other biometric methods.

Caller identity authentication may be initiated by origin device 40. In particular, origin device 40 may include voice templates and a feature for performing the caller identity authentication. In addition, origin device 40 may access a third party server 48 via network 20, where third party server 48 may provide access to a database of voice templates and/or perform the caller identity authentication. Origin device 40 then transmits a VID determined for the caller to intermediary device 42 for use in specifying services and billing for a call from origin device 40. Origin device 40 may include a caller telephony device, a PBX, a call center, a private switching system, network servers, feature servers, and other systems which provide call origination. Third party server 48 may include a telco application server, a generic application server, a database management system server, and other systems that function outside trusted telephone network 46. In particular, intermediary device 42 may facilitate communication between origin device 40 and network 20.

In addition, caller identity authentication may be initiated by intermediary device 42. Intermediary device 42 may include database systems that store voice templates and an IP for performing caller identity authentication. In addition, intermediary device 42 may access telco application server 22 outside of trusted telephone network 46 via network 20, where telco application server 22 provides a caller authentication service and/or provides access to a database of voice templates. Intermediary device 42 may include a PSTN switching network or networks. However, intermediary device 42 may also include a PBX, a call center, or other private switching system. Further, intermediary device 42 may include network servers, Websphere® (Websphere® is a registered trademark of International Business Machines Corporation (IBM)) servers, and other systems which provide call processing.

Further, caller identity authentication may be initiated by destination device 44. Destination device 44 may include voice templates and a feature for performing the caller identity authentication. In addition, destination device 44 may access a third party server 49 via network 20, where third party server 49 may provide access to a database of voice templates and/or perform the caller identity authentication. Destination device 44 will prompt a caller to provide a voice utterance at origin device 40, where intermediary device 42 facilitates communications between origin device 40 and destination device 44. Destination device 44 then determines and transmits a VID for the caller to intermediary device 42 for use in specifying services and billing for a call from origin device 40. Destination device 44 may include a callee telephony device, a PBX, a call center, a private switching system, network servers, feature servers, and other systems which provide call receipt. Third party server 48 may include a telco application server, a generic application server, a database management system server, and other systems that function outside trusted telephone network 46. In particular, intermediary device 42 may also facilitate communication between destination device 44 and network 20.

Similarly, a destination device 44 is utilized by a callee to receive a call. Advantageously, an authenticated identity of the callee may be determined as an RVID. Callee identity authentication may be initiated by origin device 40, intermediary device 42, or destination device 44, in a manner similar to initiation of caller identity authentication, as described above.

In addition to authenticating the identity of a caller or callee in a VID or RVID, the context of the call is preferably determined and transmitted as part of the VID or RVID or separate therefrom. Origin device 40, intermediary device 42, telco application server 22, and/or destination device 44 may include context inference services that perform context inference services. A context inference service may utilize context information gathered from multiple databases and may gathered context information directly from a caller or callee in response to prompts.

Context may include, but is not limited to, a requesting caller, an intended callee, a subject matter of a call, a device identity, the location of an origin or destination device, billing information, service subscriptions, the path of a call, and other information which may provide a caller or callee with context of a call. Call context may indicate when a call is made or received on behalf of another individual or business. In addition, call context may indicate in the path of a call whether a backup for the intended caller is accessed.

Information for determining the context of a call may be gathered from a caller or callee profile, from routing information utilized by intermediary device 42 from a device directory, from systems management server 28, or other databases of information. Particularly helpful for determining context, calendaring and other electronic scheduling databases included in a caller or callee profile may be utilized to determine location, subject, and times available for a call. In addition, the context inference service may, for example, infer the subject matter of a call as either business or personal based on the identity of the device from which a call originates and the location of that device. Alternatively, the subject of a call as either a business subject or personal subject may be inferred from the billing information context.

A VID or RVID may be transferred in multiple protocols, including, but not limited to, Interface Definition Language (IDL) and Extensible Markup Language (XML). A VID or RVID may include a range of information, where each type of information may be tagged or identified in some other manner. For example, the following tagged VID may be transmitted to represent an authenticated identity of a caller and context of the call:

[caller name] Jon Smith, sales person
[caller rating] +4
[caller device] Jane Doe's cell phone
[caller location] Central Time zone, Austin, Tex.
[caller on behalf of] Business XYZ
[call subject] Product A
[call billing] Jon Smith's business service provider C
[authenticated by] Jane Doe's cell phone, service provider C The requesting caller identity and other context for the call are preferably utilized to filter a schedule associated with the line number from which the requesting caller is placing a call. The schedule preferably includes events that define who may use the line number and when those persons may use the line number.

The context of the call is preferably updated to indicate the regulation placed on the caller according to the schedule for a line number. For example, the following tag may be added to the call context to indicate that the caller is allowed use of the telephony device:

[caller regulation] allowed

In another example, the following tag may be added to the call context to indicate that the caller is not allowed use of the telephony device, but indicate when an opening will be provided:

[caller regulation] blocked
[caller opening] 12PM–1PM

Preferably, a caller may be provided with the option to reserve the available time in a schedule for the telephony device. In particular, a caller may be allowed unlimited access during openings, or may be provided with a budget of call time, such as three hours per week, that may be scheduled during openings.

Figure 3:
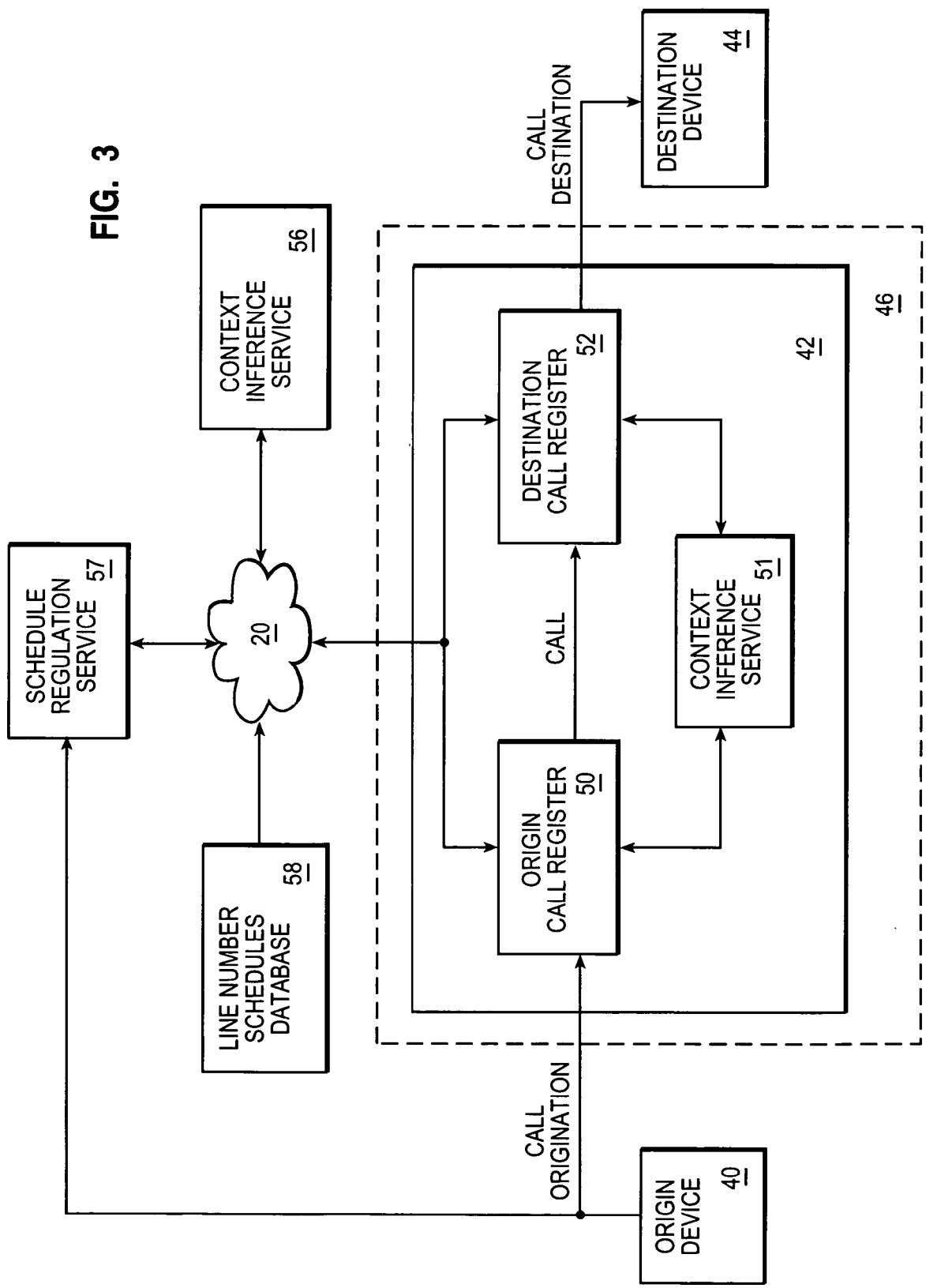
FIG. 3 depicts a block diagram of the flow of a call for time based regulation in accordance with the method, system, and program of the present invention.

With reference now to FIG. 3, there is depicted a block diagram of the flow of a call for time based regulation in accordance with the method, system, and program of the present invention. As illustrated, origin device 40 transfers a call request to intermediary device 42. The call request may be an off-hook condition for a wireline device or a network service connection request for a wireless device.

Preferably, a switching service receiving the call request establishes an origin call register 50 and retrieves a line subscriber profile for the origin device line number. The line subscriber profile may be accessed from an SCP or a data storage system external to trusted telephone network 46.

Next, a context inference service may be initiated by the origin switching service. In particular, a context inference service may be located within trusted network 46 as an IP, such as context inference service 51 or located outside trusted telephone network 46 within a telco application server accessible via network 20, such as context inference service 57. A context inference service may also be located within origin device 40 and/or may be initiated by origin device 40.

The context inference service preferably determines context for a call including, but not limited to, who is calling, an intended callee, the device utilized to place the call, the location of the caller, the billing method for the call, the path of the call, and/or the subject matter of the call. In addition, the context inference service preferably determines context for a call including, but not limited to, who receives a call, the path of line numbers utilized to access the callee, the device utilized to receive the call, the location of the callee, and the subject matter available for discussion by the callee. In addition, other categories of context may be determined.

To determine the context of the device utilized to place a call, the entity subscribing to the line number and/or an identifier for the device are preferably accessed. The first set of context clues is provided to the context inference service by the line subscriber profile. In particular, a line subscriber profile indicates the individual or business that subscribes to a particular line number. Further, a line subscriber profile may indicate that a business subscribes to a telephone service, but provide that service is subscribed to for use by a particular employee or group of employees.

In addition, the line subscriber profile indicates the billing information and services subscribed to by the line subscriber. Billing information may provide context for whether the line number is a business line or personal line. In addition, a billing context for a call may indicate the party responsible for charges incurred in the call.

Further, a line subscriber profile preferably indicates whether the line number is subscribed to for a wireline device, a wireless device, or both. Additional context information may be inferred from whether a wireline or wireless device is utilized.

In addition to determining the identity of a person associated with a line number, detecting and/or inferring the identity of the device itself is particularly advantageous context information. Preferably the identity of the device may be inferred from the line subscriber profile and other information available. A device identity may include a device name, a line number utilized to access the device, and the device type. The device name may be assigned by the line subscriber and output with a signal from the device. Alternatively, the line subscriber profile may indicate the device name. The device type may indicate the type of line utilized to access the device, including, but not limited to, wireline, wireless, or multiplexed. In addition, the device type may indicate the type of device accessed by the line including, but not limited to, a car telephone line, a computer modem line, a PBX land line, a residential line, a business line, or an Asymmetric Digital Subscriber Line (ADSL) multiplexed line.

Further, determining or inferring the location of a device is advantageous context information. For a wireless device, the location of a device may be determined most precisely where a GPS tracking system is utilized by the origin device 40 or intermediary device 42, to determine the exact geographical location of a caller. For a wireline device, the location of the device is fixed according to the location the service is installed for the number.

In addition, for both a wireline and wireless device, a general location of the originated call may be determined from the geographical area covered by the switching center receiving the call. Wireless devices are preferably provided service by a particular tower or other signal distribution point. The geographical location and area covered by that tower may provide a general location of the origin of a call. As the origin device moves from one wireless coverage area to another, the location may be updated.

The context inference service may infer additional context from location information. For example, the time zone of the caller, the direction of movement of the caller, and other location related information may be inferred from location information.

Advantageously, the identity of the caller requesting to place a call via origin device 40 is preferably authenticated as a VID. The authentication may be initiated by origin device 40, intermediary device 42, or destination device 44. Context inference service 56 may then utilize the VID for further update the context according to a caller profile associated with the VID. For example, a billing plan for the caller and an estimated talk time for the caller may be accessed from the caller profile.

In particular, a caller profile may indicate a schedule or other electronic calendaring for the requesting caller. By accessing scheduled events for the caller, inferences may be made as to the expected length of a call and the expected subject of a call. For example, a caller's schedule may include a scheduled event for placing the current call that indicates the subject of the call and the time scheduled for the call. In another example, a caller's schedule may indicate the next scheduled event, boundary for estimating a length of a call.

The subject matter of a call may be determined by prompting a caller to provide a voice or text entry indicating the subject matter of the call. Alternatively, the context inference service may infer the subject matter of a call based on the caller's schedule. The context inference service may also infer the subject matter of a call based on the caller's business, expertise, or the business associated with the line number utilized by the caller.

In addition, a caller profile may include multiple roles that a caller takes. For example, a caller may be a parent, a business person, a coach, and a volunteer. The context inference service may infer which role the caller is taking depending on other context or may prompt the caller to select a role. Further, the caller may select, at origin device 40, a role for the call when placing the call request.

A schedule regulation service 57 may be accessed from origin device 30 or intermediary device 42. Schedule regulation service 57 preferably determines whether a caller is allowed access to placement of a call via origin device 40. In addition, schedule regulation service 57 preferably accesses at least one schedule for a line number interfaced with origin device 40. Schedules may be accessed from origin device 40, from within trusted telephone network 46 and via network 20 outside trusted telephone network 46.

A line subscriber may designate a schedule for a line number. For example, a line number schedules database 58 may be accessed outside trusted telephone network 46. Alternatively, a line number schedule may be stored at each origin device authorized to interface with the line number. In addition, a schedule for the line subscriber may be accessed. The line subscriber schedule may indicate times when the subscriber will need the line open to place calls.

In addition, the schedules of callers associated with a line number may be accessed. For example, where a line is subscribed to by one person, but others typically utilize the line, the schedules of others are accessed and compiled to determine a schedule for use of the line.

Further, a third party may designate a schedule for a line. For example, a court may order a schedule for outgoing calls placed from a particular phone by a particular caller.

Preferably, the schedule is filtered according to the call context to determine current relevant events from among the multiple events in a schedule. A current relevant event may include a meeting, appointment, location, others involved in the event, duration of the event, and other information that describes the previous, current, or future environments in which a callee may be located. The current relevant event may be described with or without time boundaries.

Advantageously, a current relevant event may also include callers who are allowed to access the line during a particular time period. The allowed caller designations may be included concurrently with another relevant event, such as a meeting or may be defined independently of other relevant events.

Further, a current relevant event may include billing required for a requesting caller. For example, a line subscriber may have a billing plan that allows for free long distance during evening hours, but pay by the minute long distance service during daytime hours. An event may indicate that a requesting caller is required to have a billing plan for accepting charges for long distance billing during the daytime hours, but need not switch to the billing plan during the evening hours.

Current relevant events may be rated according to importance. In addition, caller identities may be given a rating according to time of day. If the caller identity rating for the current time period matches the rating requirement for the current relevant event, then the caller will be allowed access. Ratings may include numerical scales, alphanumeric scales, and other scale basis.

In addition, each caller may earn points that are redeemable for use of a line. Points may be earned, bought, transferred, shared, and reduced. For example, a parent may grant phone points as an incentive for doing chores. In another example, a parent may designate phone points required for use of the line at different points in the day to limit the amount of time daily that the line may be used.

Preferably, the schedule regulation service either allows or blocks a caller from use of a line according to the schedule in view of the call context. Either regulation is preferably added to the context of the call.

If use is allowed, the schedule regulation service may add limits on the length of use. Length of use may be determined, for example, according to the amount of time allowed until the next scheduled event, according to the amount of points available to the caller, or other criteria determined from the relevant scheduled events.

If use is blocked, the schedule regulation service may indicate when use may be allowed. A caller may be provided an option to select to reserve the next allowed time period in the schedule for the line number.

If use is allowed, then the call is transferred from origin call register 50 to a destination call register 52 implemented by a destination call center processing the call for the requested destination line number. The communication request is triggered to destination device 44. In addition, the context of the call may be transferred to destination device 44 for output to the callee.

Advantageously, where a limitation is placed on the amount of time allowed for a call, the context transferred to destination device 44 may indicate the limitation, such that the callee is informed of the allowed length of the call from origin device 40 by the current caller.

The identity of the callee answering the call is preferably authenticated and profiles accessed for the line subscriber and/or callee. Returning an RVID determined for the callee to the caller is advantageous because the RVID preferably includes the callee name and information about the transfer.

It should be noted that regulations for use of telephone service may be imposed simultaneously by multiple entities. In addition, it should be noted that the identities of parties to a call and other context of the call are monitored during the call and call context is dynamically adjusted. As a call context adjusts, the regulations associated with the call context preferably also adjust.

Figure 4:
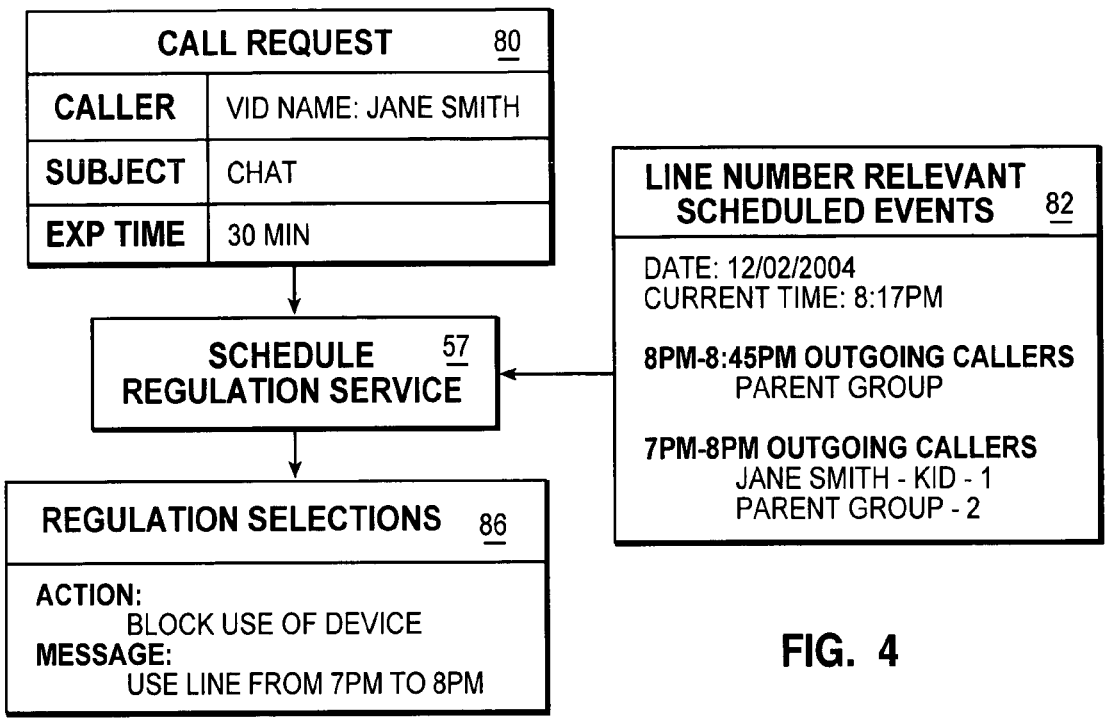
FIG. 4 illustrates an illustrative example of blocking use in accordance with the method, system, and program of the present invention.

Referring now to FIG. 4, there is illustrated an illustrative example of blocking use in accordance with the method, system, and program of the present invention. As depicted a call request 80 indicates the context of the call, as determined by a context inference service. Here, the caller name, subject of the call, and expected call time are included in the call context. In alternate embodiments of the present invention, other items may be included in the call context.

Schedule regulation service 57 receives call request 80 and accesses a schedule for the line number. The line number schedule is preferably filtered to include line number relevant scheduled events 82.

Schedule regulation service 57 determines regulation selections 86 for the call to be added to the call context. The origin device may respond to the regulation by blocking the line from connecting with the origin call center for the current caller in the current call context. Alternatively, the origin call center may block the line from use by the caller.

In the example, the requesting caller is blocked from using the line number because currently only those in the parent group are allowed as outgoing callers. The requesting caller is not in the "parent group", but is a kid.

The next available time for the requesting caller to make a call is from 7PM to 8PM when the outgoing callers include the requesting caller. Regulation selections 86 includes a message indicating the next available time to the requesting caller.

Figure 5:
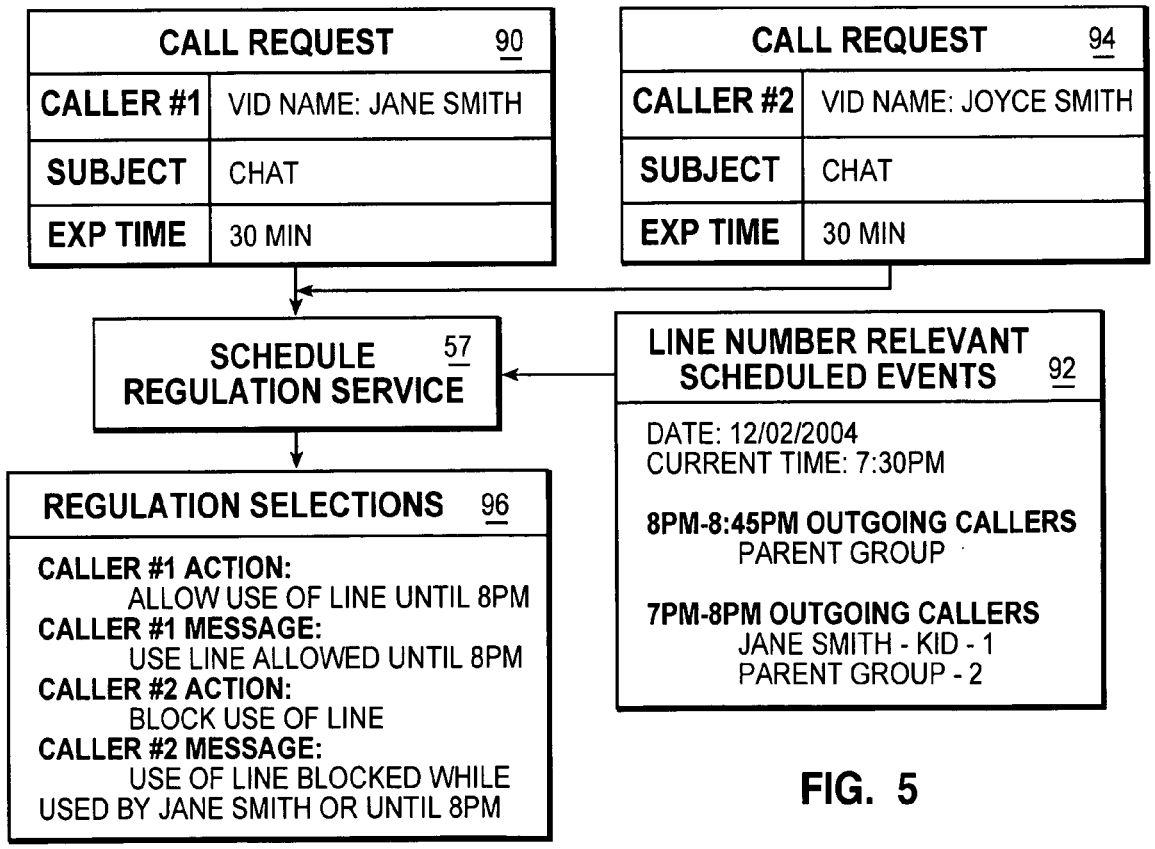
FIG. 5 depicts an illustrative example of selecting which caller is allowed use of a line in accordance with the method, system, and program of the present invention.

With reference now to FIG. 5, there is depicted an illustrative example of selecting which caller is allowed use of a line in accordance with the method, system, and program of the present invention. As illustrated, a call request 90 is received at the same time as a call request 94. Each of the call requests indicates a call context. The present example illustrates handling multiple devices requesting accessing to a single line.

Line number relevant scheduled events 92 indicates relevant scheduled events for the line number requested for use. In the example, both the requesting callers are currently included in the allowed outgoing callers, where "Joyce Smith" is included in the "parent group". Since the allowed outgoing callers are ranked, "Jane Smith" is given priority over "Joyce Smith" for use of the line until 8PM.

While in the example, the callers are ranked numerically, in alternate embodiments of the present invention, other types of ranking may be utilized. For example, each caller may be provided a permanent rank for the line or a rank that adjusts according to the number of calls already placed that day from the line. Where there is a tie in rank, the line subscriber may be given priority over other callers, for example.

Regulation selections 96 include regulations determined for the call to be added to the call context and utilized for controlling access to the line. As depicted, caller #1 is allowed use of the line, but only until 8PM. Caller #2 is blocked from use of the line while in use by caller #1 or until 8PM.

Figure 6:
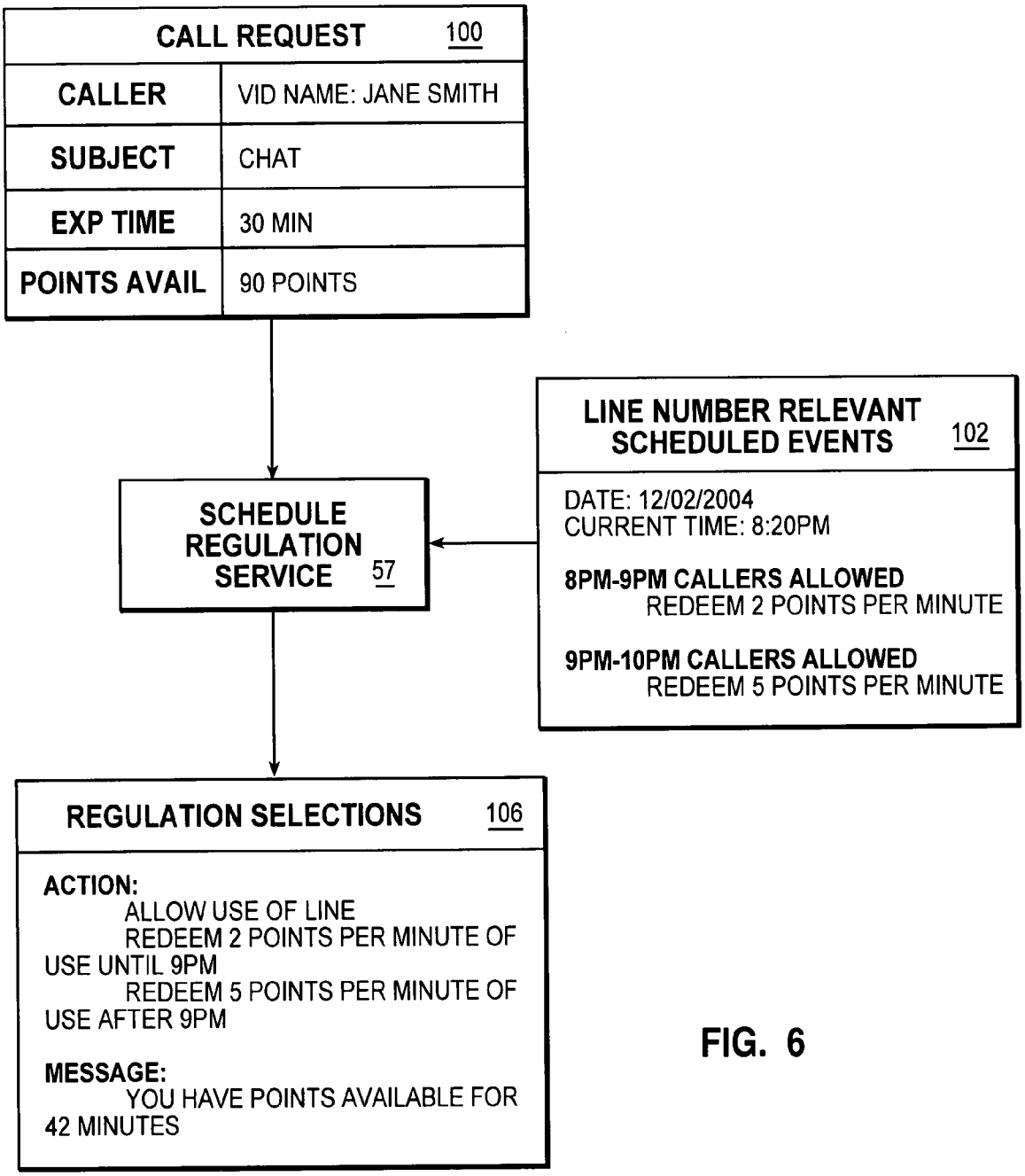
FIG. 6 illustrates an illustrative example of allowing use of a line for redemption of points in accordance with the method, system, and program of the present invention.

Referring now to FIG. 6, there is illustrated an illustrative example of allowing use of a line for redemption of points in accordance with the method, system, and program of the present invention. As depicted, a call request 100 indicates the caller identity, subject of the call, expected time for the call, and points available to the requesting caller. Advantageously, caller points may be stored according to the caller identity with a caller profile or in association with the line number.

Line number relevant scheduled events 102 indicate events relevant to the schedule for the line number requested for use. During the designated time of the request, any caller is allowed use of the line with the redemption of two points per minute. In addition, after 9PM, any caller is allowed use of the line with the redemption of five points per minute.

Schedule regulation service 57 determines regulation selections 106 indicating the requesting caller is allowed use of the line and indicates the number of points to redeem for each minute of use. In the example, a message is also included in regulation selections 106 to indicate the number of minutes allotted to the caller according to the number of points accessible.

Figure 7:
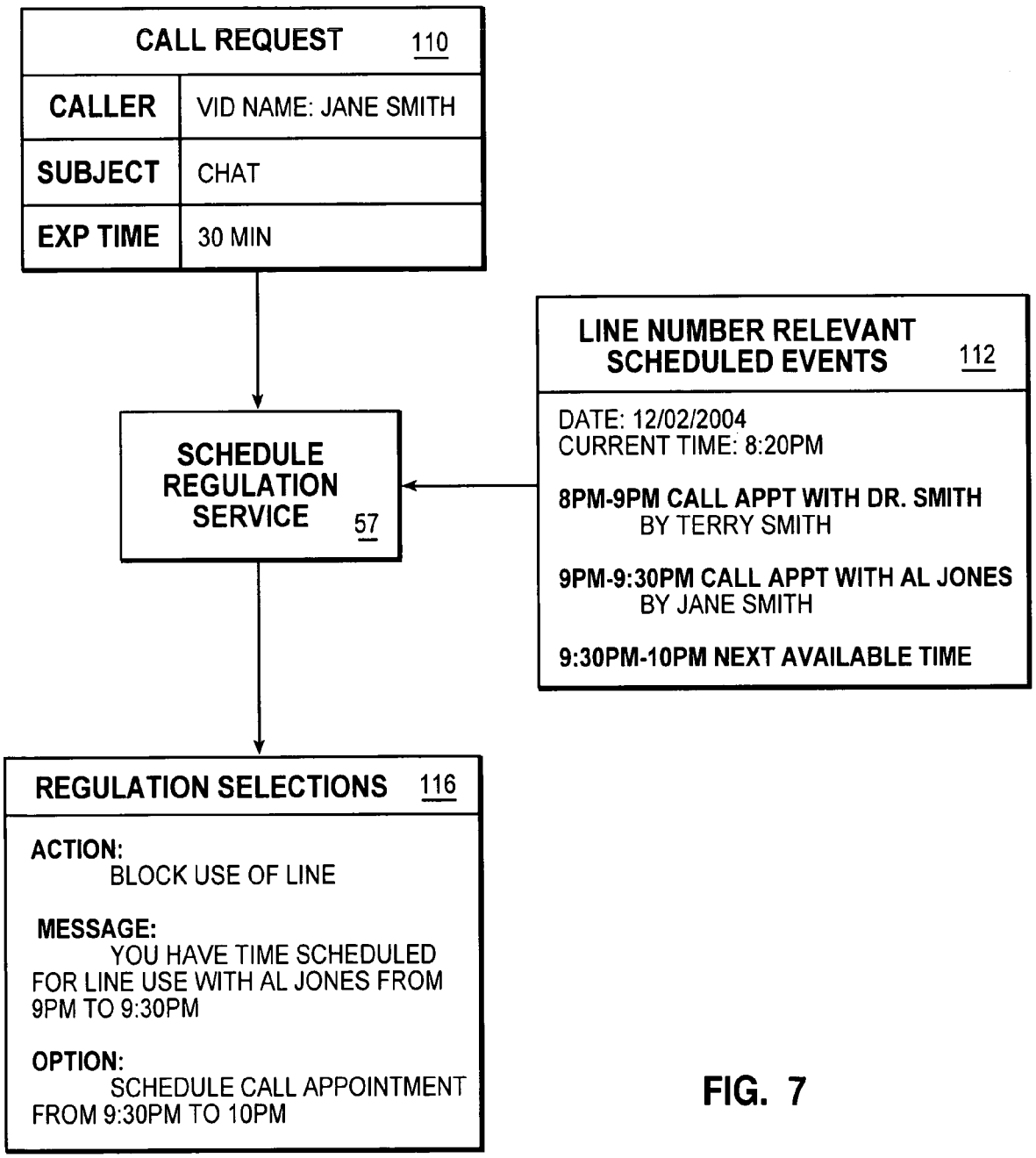
FIG. 7 depicts an illustrative example of a schedule with call appointments in accordance with the method, system, and program of the present invention.

With reference now to FIG. 7, there is depicted an illustrative example of a schedule with call appointments in accordance with the method, system, and program of the present invention. As depicted, a call request 110 indicates the caller identity, subject of the requested call, and expected time for the requested call.

As determined by schedule regulation service 57, line number relevant scheduled events 112 indicate events relevant to the schedule for the line number requested for use. During the designated time of the request, another caller has scheduled a call appointment. Advantageously, callers may be permitted to schedule call appointments in the line number schedule, where the caller blocks all other outgoing calls during that time, independent of whether the caller actually uses the time or not. Call appointments may also be inferred from the schedules of callers with access to the line number.

Schedule regulation service 57 determines regulation selections 116. In the example, regulation selections 116 indicate the requesting caller is blocked from use of the line because another caller has scheduled the time with a call appointment. A message includes in regulation selections 116 preferably indicates to the requesting caller when the requesting caller has scheduled time.

In addition, schedule regulation service 57 indicates that the requesting caller has an option to schedule a call appointment during the next available time. Preferably, an automated system will direct the caller to select the time and if selected will direct the caller to provide additional specifications for the time.

Figure 8:
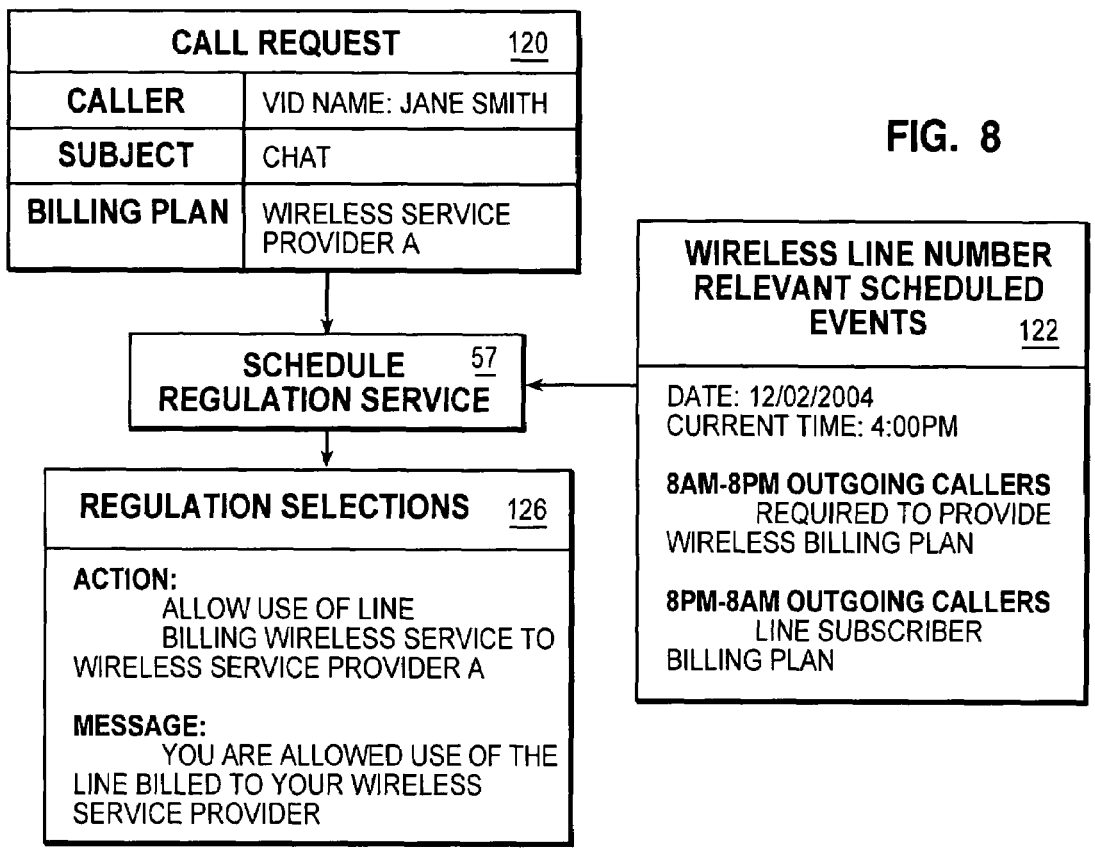
FIG. 8 illustrates an illustrative example of a line regulated according to billing plan in accordance with the method, system, and program of the present invention.

Referring now to FIG. 8, there is illustrated an illustrative example of a line regulated according to billing plan in accordance with the method, system, and program of the present invention. As depicted, a call request 120 includes a requesting caller identity, a call subject and a billing plan for the requesting caller. In the example, the billing plan indicates a wireless service provider to which the call may be switched and/or billed. Alternatively, a billing plan may also include an account to which a service cost is billed or debited.

Schedule regulation service 57 determines wireless line number relevant scheduled events for the wireless line number. In the example, the events indicate what type of billing plan is required for a requesting caller. For the time designated, a requesting caller is required to provide a wireless billing plan to cover wireless service charges for the call.

In addition, schedule regulation service 57 determines regulation selections 126. In the example, the caller is allowed use of the line because a wireless service provider is provided in the billing plan of the requesting caller. The call may be billed to the requesting caller's wireless service provider and/or switched to the service provided by the requesting caller's wireless service provider. Preferably, a message indicates use of the requesting caller's wireless service provider to the requesting caller.

Figure 9:
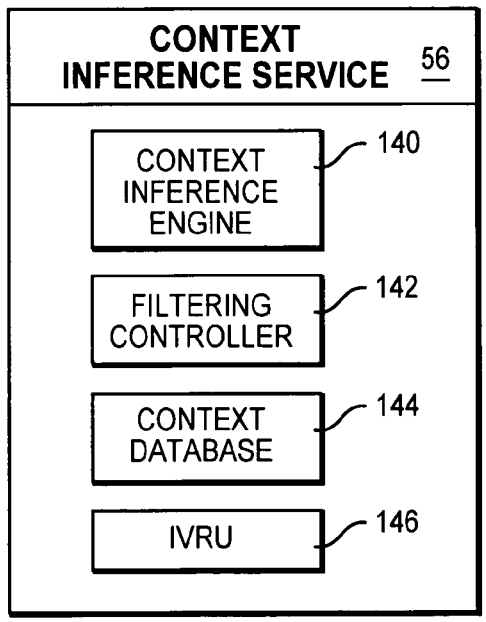
FIG. 9 depicts a block diagram of a context inference service in accordance with the method, system, and program of the present invention.

With reference now to FIG. 9, there is illustrated a block diagram of a context inference service in accordance with the method, system, and program of the present invention. Context inference service 56 is preferably housed within a computing system including at least a processor, memory, system software, application software, and network software that execute to provide a telco service.

In particular, context inference service 56 includes a context inference engine 140. Context inference engine 140 preferably determines the context for a call through information accessible for the call and through inferences from that information. In addition, context inference engine 140 may filter context information for each entity receiving that information.

A filtering controller 142 preferably filters context determined by context inference engine 140 according to filtering preferences of the caller. In addition, the line number subscriber may designate filtering preferences for context including the line number.

A context database 144 preferably records and stores context for each call processed by context inference service 56. Context database 144 may be later accessed to provide verification and context for billed call transactions. In addition, context database 144 preferably stores the length of a call such that future expected call times may be predicted.

An interactive voice recognition unit (IVRU) 126 preferably prompts the caller and callee to provide information required for determining context and detects caller or callee entries. In addition, IVRU 126 may prompt the caller and callee to designate additional preferences for filtering context.

Figure 10:
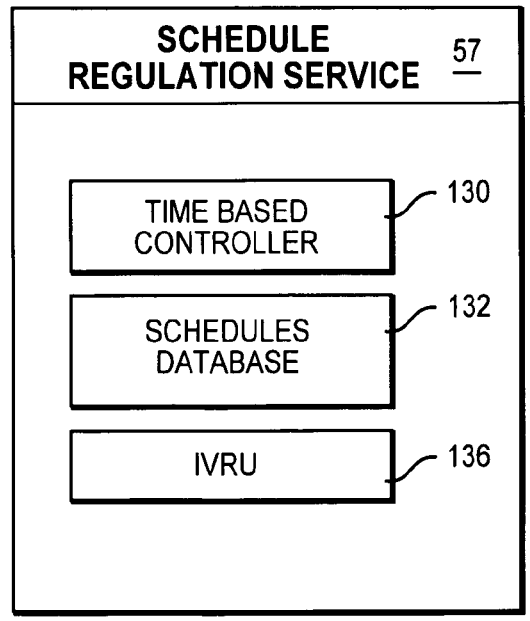
FIG. 10 illustrates a block diagram of a schedule regulation service in accordance with the method, system, and program of the present invention

Referring now to FIG. 10, there is illustrated a block diagram of a schedule regulation service in accordance with the method, system, and program of the present invention. Schedule regulation service 57 is preferably housed within a computing system including at least a processor, memory, system software, application software, and network software that execute to provide a telco service.

In particular, schedule regulation service 57 includes a time based controller 130. Time based controller 130 preferably receives the context for a requested call, determines relevant scheduled events for the line number, and designates regulation actions for the requested call. Regulation actions may include allowing the call, blocking the call, deducting points for the call, placing limits of the time allowed for the call, and other call processing actions.

Schedules database 132 may be accessed in association with the line number, from a schedule for the line number subscriber, from schedules for callers with access to the line number, from third party scheduling, and from other scheduling relevant to the line number. Schedules database 132 may be stored at a telephony device or at a database independent of a telephony device. In addition, a line number may be registered to a particular telephony device or devices, where each of registered devices includes a schedule accessible to schedules database 132.

An IVRU 136 may prompt a requesting caller to indicate the estimated time for a call, prompt the requesting caller to select a billing method from the requesting caller's billing plan, prompt the caller to select to reserve time in the schedule for a call, and other promptings to a caller.

Figure 11:
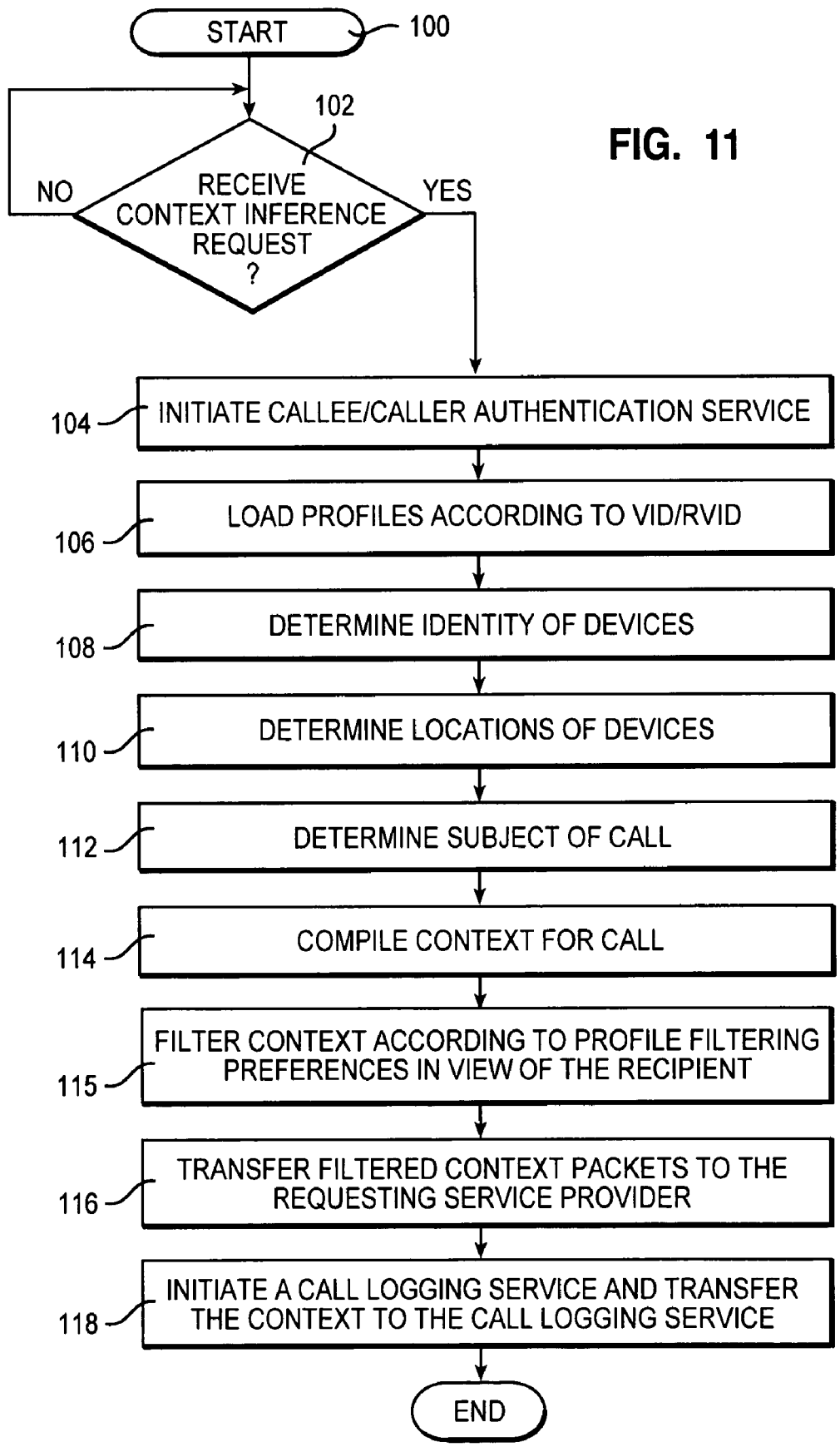
FIG. 11 depicts a high level logic flowchart of a process and program for determining call context in accordance with the present invention.

Referring now to FIG. 11, there is illustrated a high level logic flowchart of a process and program for determining call context in accordance with the present invention. As depicted, the process starts at block 100 and thereafter proceeds to block 102. Block 102 illustrates a determination as to whether a call context request is received. If a call context request is not received, then the process iterates at block 102. If call context request is received, then the process passes to block 104. A call context request may also include line subscriber profile information and other call information already loaded by the requesting service provider.

Block 104 depicts initiating a caller/callee identity authentication service. Next, block 106 illustrates loading profiles according to the VID/RVID authenticated for the caller/callee. Alternatively, VID/RVID for the call may be transferred with the call context request.

Next, block 108 illustrates determining the identity of any devices utilized in the call. Where a server enables a call from an individual telephone device, the identities of the individual telephone device and the server are preferably determined. Device identity may be determined from the line subscriber identity, a device identity output by the device, the type of service subscribed to for the device, and other available profile information.

Block 110 depicts determining the locations of any devices utilized in the call. Location may be precisely detected from a GPS coordinate. Alternatively, location may be inferred within a general area according to the geographical area covered by an office switch or a wireless tower originating or terminating the call. Further, location may be determined by the physical address assigned to a line number.

Block 112 illustrates determining the subject matter of a call. Subject matter may be inferred, for example, from services subscribed to by the caller/callee, from previous subject matter of calls between the parties, from the location of the calling party, or from the device identities. In addition, a party to a call may be prompted to indicate the subject matter of a call.

Thereafter, block 114 depicts compiling the context information for a call. In compiling context information, the information utilized to determine context is preferably consolidated into general context categories. In addition, block 115 illustrates filtering the context information for a call according to caller and callee profile preferences. Next, block 116 illustrates transferring the call context to the requesting service provider.

Block 118 depicts initiating a call logging service and transferring the call context to the call logging service, and the process ends. In particular, a caller or callee profile may indicate call logging preferences that are included in the context transferred to the call logging service. Alternatively, the call logging service may access call logging preferences for the caller, callee, or third party.

Figure 12:
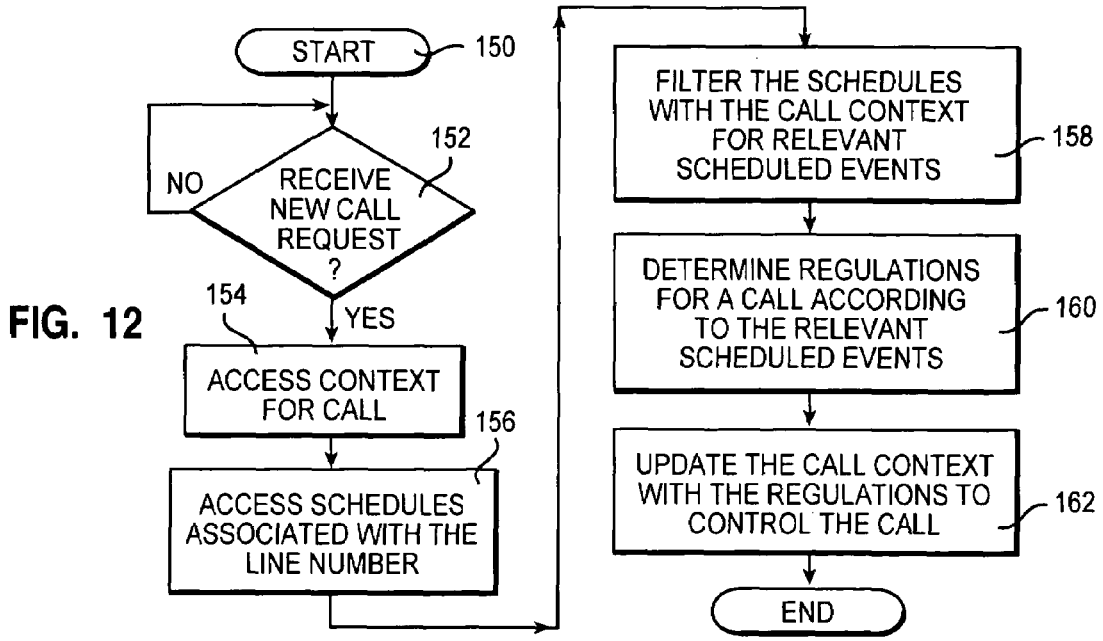
FIG. 12 illustrates a high level logic flowchart of a process and program for controlling a time based regulation service in accordance with the method, system, and program of the present invention.

With reference now to FIG. 12, there is depicted a high level logic flowchart of a process and program for controlling a time based regulation service in accordance with the method, system, and program of the present invention. As illustrated, the process starts at block 150 and thereafter proceeds to block 152. Block 152 depicts a determination as to whether a new call request is received. If a new call request is not received, then the process iterates at block 152. If a new call request is received, then the process passes to block 154.

Block 154 depicts accessing the context for a call. Next, block 156 illustrates accessing the schedules associated with the line number. Thereafter, block 158 depicts filtering the schedules with the call context to determine relevant schedules events. Relevant schedules events may include call appointments, outgoing caller designations, and other types of line use events. Relevant events may include past events, current events, and future events.

Block 160 illustrates determining regulations for the call according to the relevant scheduled events. Where more than one caller is requesting to place a call, the regulations indicate which caller, if either is allowed to place a call. Where more than one caller is requesting to place a call through a PBX, the regulations may indicate allowing some calls, blocking some calls, and wait listing some calls until a line opens. Where a caller is required to pay for the telephone service or redeem points, the regulations indicate the payment plan.

The regulations may also include messages to be transferred to the requesting caller at a telephony device or other interface. The messages may be output in text, audio, video, graphics, or other available formats.

Next, block 162 depicts updating the call context with the regulations to control the call, and the process ends. The call context may be utilized by a telephony device to regulate the actions available through the telephony device. In addition, the call context may be utilized by a call center to regulate the actions available through the call center.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention.

What is claimed is:

1. A method for regulating use of a telephone line, comprising:

detecting an authenticated identity of a caller requesting use of a telephone line to place an outgoing call and a subject of said outgoing call at at least one service located within a packet-switching network outside a trusted telephone network facilitating said outgoing call and communicative with a service provider within said trusted telephone network via a secured gateway, wherein said subject of said outgoing call specifies at least one anticipated subject matter to be discussed during said outgoing call;

selecting, using said service, at least one relevant scheduled event for said telephone line from among a plurality of scheduled events for said telephone line, wherein said at least one relevant scheduled event specifies at least one limitation on at least one type of subject matter allowed during a current time period and a selection of user identities allowed to place outgoing calls via said telephone line during said current time period;

only directing said service provider within said trusted telephone network to allow use of said telephone line to place said outgoing call by said caller during said current time period if said caller identity matches one of said selection of user identities currently allowed to place said outgoing call and said subject matter of said outgoing call matches said at least one type of subject matter allowed during said current time period.

2. The method for regulating use according to claim 1, wherein detecting an identity further comprises:

detecting said identity of said caller from a voice authentication.

3. The method for regulating use according to claim 1, further comprising:

detecting, at said service, an estimated time duration for said outgoing call requested by said caller, wherein said expected time duration for said outgoing call is detected from a caller profile associated with said authenticated identity comprising at least one from among an averaged time per call by said caller over a selection of previous call times stored in said caller profile and a schedule for said caller indicating scheduling limitations on a duration of said outgoing call; and responsive to said estimated time duration exceeding said current time period, alerting said caller to said time limitation and enabling said caller to select to add a new scheduled event to said plurality of scheduled events for said telephone line designating a particular time period reserved for said caller identity and said subject for said estimated time duration.

4. The method for regulating use according to claim 1, further comprising:

detecting an amount of redeemable points available to said caller in a caller profile associated with said caller identity for placing said outgoing call; and comparing a point cost for each minute during said current time period of said relevant scheduled event according to said amount of redeemable points available for said outgoing call and directing said service provider to only allow said outgoing call for a calculated time period available to said caller during said current time period with said amount of redeemable points.

5. The method for regulating use according to claim 1, further comprising:

controlling output of a message to said caller indicating at least one from among a reason for a blocking said telephone line, a next available time for use of said telephone line to place said outgoing call, and an amount of time available for use of said telephone line to place said outgoing call.

6. The method for regulating use according to claim 1, further comprising:

providing said caller with an option for reserving a call appointment in said plurality of scheduled events to place said outgoing call.

7. A system for regulating use of a telephone line, comprising:

at least one service located within a packet-switching network outside a trusted telephone network facilitating an outgoing call via said telephone line and communicative with a service provider for said telephone line within said trusted telephone network via a secured gateway;

said at least one service further comprising:

means for detecting an authenticated identity of a caller requesting use of said telephone line to place an outgoing call and a subject of said outgoing call, wherein said subject of said outgoing call specifies at least one anticipated subject matter to be discussed during said outgoing call;

means for selecting at least one relevant scheduled event for said telephone line from among a plurality of scheduled events for said telephone line, wherein said at least one relevant scheduled event specifies at least one limitation on at least one type of subject matter allowed during a current time period and a selection of user identities allowed to place outgoing calls via said telephone line during said current time period; and means for only directing said service provider within said trusted telephone network to allow use of said telephone line by said caller to place said outgoing call during said current time period if said caller identity matches one of said selection of user identities currently allowed to place said outgoing call and said subject matter of said outgoing call matches said at least one type of subject matter allowed during said current time period.

8. The system for regulating use according to claim 7, wherein said means for detecting an identity further comprises:

means for detecting said identity of said caller from a voice authentication.

9. The system for regulating use according to claim 7, said service further comprising:

means for detecting an estimated time duration for said outgoing call requested by said caller, wherein said expected time duration for said outgoing call is detected from a caller profile associated with said authenticated identity comprising at least one from among an averaged time per call by said caller over a selection of previous call times stored in said caller profile and a schedule for said caller indicating scheduling limitations on a duration of said outgoing call; and means responsive to said estimated time duration exceeding said current time period, for alerting said caller to said time limitation and enabling said caller to select to add a new scheduled event to said plurality of scheduled events for said telephone line designating a particular time period reserved for said caller identity and said subject for said estimated time duration.

10. The system for regulating use according to claim 7, said service further comprising:

means for detecting an amount of redeemable points available to said caller in a caller profile associated with said caller identity for placing said outgoing call; and means for comparing a point cost for each minute during said current time period of said relevant scheduled event according to said amount of redeemable points available for said outgoing call and directing said service provider to only allow said outgoing call for a calculated time period available to said caller during said current time period with said amount of redeemable points.

11. The system for regulating use according to claim 7, said service further comprising:

means for controlling output of a message to said caller indicating at least one from among a reason for a blocking said telephone line, a next available time for use of said telephone line to place said outgoing call, and an amount of time available for use of said telephone line to place said outgoing call.

12. The system for regulating use according to claim 7, said service further comprising:

means for providing said caller with an option for reserving a call appointment in said plurality of scheduled events to place said outgoing call.

13. A program for regulating use of a telephone line, comprising:

a recording medium;

means, recorded on said recording medium, for detecting an authenticated identity of a caller requesting use of a telephone line to place an outgoing call and a subject of said outgoing call at at least one service located within a packet-switching network outside a trusted telephone network facilitating said outgoing call and communicative with a service provider within said trusted telephone network via a secured gateway, wherein said subject of said outgoing call specifies at least one anticipated subject matter to be discussed during said outgoing call;

means, recorded on said recording medium, for selecting, using said service, at least one relevant scheduled event for said telephone line from among a plurality of scheduled events for said telephone line, wherein said at least one relevant scheduled event specifies at least one limitation on at least one type of subject matter allowed during a current time period and a selection of user identities allowed to place outgoing calls via said telephone line during said current time period; and means, recorded on said recording medium, for only directing said service provider within said trusted telephone network to allow use of said telephone line by said caller to place said outgoing call during said current time period if said caller identity matches one of said selection of user identities currently allowed to place said outgoing call and said subject matter of said outgoing call matches said at least one type of subject matter allowed during said current time period.

14. The program for regulating use according to claim 13, further comprising:

means, recorded on said recording medium, for detecting said identity of said caller from a voice authentication.

15. The program for regulating use according to claim 13, further comprising:

means, recorded on said recording medium, for detecting an estimated time duration for said outgoing call requested by said caller, wherein said expected time duration for said outgoing call is detected from a caller profile associated with said authenticated identity comprising at least one from among an averaged time per call by said caller over a selection of previous call times stored in said caller profile and a schedule for said caller indicating scheduling limitations on a duration of said outgoing call; and means, recorded on said recording medium, responsive to said estimated time duration exceeding said current time period, for alerting said caller to said time limitation and enabling said caller to select to add a new scheduled event to said plurality of scheduled events for said telephone line designating a particular time period reserved for said caller identity and said subject for said estimated time duration.

16. The program for regulating use according to claim 13, further comprising:

means, recorded on said recording medium, for detecting an amount of redeemable points available to said caller in a caller profile associated with said caller identity for placing said outgoing call; and means, recorded on said recording medium, for comparing a point cost for each minute during said current time period of said relevant scheduled event according to said amount of redeemable points available for said outgoing call and directing said service provider to only allow said outgoing call for a calculated time period available to said caller during said current time period with said amount of redeemable points.

17. The program for regulating use according to claim 13, further comprising:

means, recorded on said recording medium, for controlling output of a message to said caller indicating at least one from among a reason for a blocking said telephone line, a next available time for use of said telephone line to place said outgoing call, and an amount of time available for use of said telephone line to place said outgoing call.

18. The program for regulating use according to claim 13, further comprising:

means, recorded on said recording medium, for providing said caller with an option for reserving a call appointment in said plurality of scheduled events to place said outgoing call.

19. The method for regulating use according to claim 1, wherein detecting an authenticated identity of a caller requesting use of a telephone line to place an outgoing call and a subject of said outgoing call further comprises:

accessing at said service a schedule accessible within said packet-switching network and associated with said authenticated identity of said caller, wherein said schedule comprises at least one scheduled entry for said caller, wherein said scheduled entry comprises a time period matching a present time and a subject entry; and inferring said subject matter for said call from said subject entry of said scheduled entry.

20. The method for regulating use according to claim 1, wherein detecting an authenticated identity of a caller requesting use of a telephone line to place an outgoing call and a subject of said outgoing call further comprises:

accessing at said service at least one of an identifier for a particular device used by said caller from among a plurality of devices enabled to place an outgoing call via said telephone line and a location of said particular device; and inferring said subject matter to be discussed during said call from said at least one of said identifier for said particular device and said location of said particular device.

21. The system for regulating use according to claim 7, wherein said means for detecting an authenticated identity of a caller requesting use of a telephone line to place an outgoing call and a subject of said outgoing call further comprises:

means for accessing at said service a schedule accessible within said packet-switching network and associated with said authenticated identity of said caller, wherein said schedule comprises at least one scheduled entry for said caller, wherein said scheduled entry comprises a time period matching a present time and a subject entry; and means for inferring said subject matter for said call from said subject entry of said scheduled entry.

22. The system for regulating use according to claim 7, wherein said means for detecting an authenticated identity of a caller requesting use of a telephone line to place an outgoing call and a subject of said outgoing call further comprises:

means for accessing at said service at least one of an identifier for a particular device used by said caller from among a plurality of devices enabled to place an outgoing call via said telephone line and a location of said particular device; and means for inferring said subject matter to be discussed during said call from said at least one of said identifier for said particular device and said location of said particular device.

23. The program for regulating use according to claim 13, further comprising:

means, recorded on said recording medium, for accessing at said service a schedule accessible within said packet-switching network and associated with said authenticated identity of said caller, wherein said schedule comprises at least one scheduled entry for said caller, wherein said scheduled entry comprises a time period matching a present time and a subject entry; and means, recorded on said recording medium, for inferring said subject matter for said call from said subject entry of said scheduled entry.

24. The program for regulating use according to claim 13, further comprising:

means, recorded on said recording medium, for accessing at said service at least one of an identifier for a particular device used by said caller from among a plurality of devices enabled to place an outgoing call via said telephone line and a location of said particular device; and means, recorded on said recording medium, for inferring said subject matter to be discussed during said call from said at least one of said identifier for said particular device and said location of said particular device.

* * * * *